United States Patent
Lin et al.

(10) Patent No.: US 11,325,247 B2
(45) Date of Patent: May 10, 2022

(54) ROBOTIC ARM CONTROL METHOD AND APPARATUS AND TERMINAL DEVICE USING THE SAME

(71) Applicant: UBTECH ROBOTICS CORP LTD, Shenzhen (CN)

(72) Inventors: Zecai Lin, Shenzhen (CN); Zhaohui An, Shenzhen (CN); Yizhang Liu, Shenzhen (CN); Meihui Zhang, Shenzhen (CN); Youjun Xiong, Shenzhen (CN); Jianxin Pang, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 317 days.

(21) Appl. No.: 16/817,576

(22) Filed: Mar. 12, 2020

(65) Prior Publication Data

US 2021/0187731 A1 Jun. 24, 2021

(30) Foreign Application Priority Data

Dec. 20, 2019 (CN) .......................... 201911330302.4

(51) Int. Cl.
*B25J 9/16* (2006.01)
*B25J 13/06* (2006.01)

(52) U.S. Cl.
CPC ............. *B25J 9/1602* (2013.01); *B25J 13/06* (2013.01)

(58) Field of Classification Search
CPC .................................. B25J 9/16; B25J 13/06
See application file for complete search history.

(56) References Cited

U.S. PATENT DOCUMENTS

| | | | | |
|---|---|---|---|---|
| 7,646,161 | B2 * | 1/2010 | Albu-Schaffer | A61B 34/76 901/41 |
| 7,756,606 | B2 * | 7/2010 | Nakajima | B25J 9/1643 901/14 |
| 8,560,122 | B2 * | 10/2013 | Park | G05B 19/425 901/50 |
| 2014/0074289 | A1 * | 3/2014 | Xiao | B25J 9/1643 901/3 |
| 2015/0081164 | A1 * | 3/2015 | Yi | G01B 21/22 248/558 |
| 2017/0277167 | A1 * | 9/2017 | Noda | B25J 9/1643 |
| 2018/0186001 | A1 * | 7/2018 | Scheurer | B25J 9/1664 |
| 2019/0176334 | A1 * | 6/2019 | Zhou | B25J 9/1679 |

\* cited by examiner

*Primary Examiner* — Kira Nguyen

(57) ABSTRACT

The present disclosure provides a robotic arm control method as well as an apparatus and a terminal device using the same. The method includes: obtaining a current joint angle of each of M joints of the robotic arm; obtaining a reference included angle based on the current joint angle of each of the M joints of the robotic arm; determining an expected included angle corresponding to the robotic arm within a target angle range based on the reference included angle and the preset included angle related evaluation function; and controlling the robotic arm based on the target joint angles of the M joints.

20 Claims, 7 Drawing Sheets

ROBOTIC ARM CONTROL METHOD AND APPARATUS AND TERMINAL DEVICE USING THE SAME

CROSS REFERENCE TO RELATED APPLICATIONS

The present disclosure claims priority to Chinese Patent Application No. 201911330302.4, filed Dec. 20, 2019, which is hereby incorporated by reference herein as if set forth in its entirety.

BACKGROUND

1. Technical Field

The present disclosure relates to robotic arm technology, and particularly to a robotic arm control method as well as an apparatus and a terminal device using the same.

2. Description of Related Art

With the continuous progress of robotic arm technology and the expansion of its application scenarios, the requirements for the operating capability of robotic arms are also increasing. Since robotic arms have better flexibility and adaptability, the robotic arms with redundant degrees of freedom have been widely used in a variety of application scenarios.

During the movement process of a robotic arm with redundant degrees of freedom, because each joint of the robotic arm have a corresponding movement range, during the inverse kinematics solving of the robotic arm, the calculated control angle of a joint may exceed its corresponding movement range, which causes the robotic arm difficult to perform related operations reasonably and efficiently.

BRIEF DESCRIPTION OF THE DRAWINGS

In order to more clearly illustrate the technical solutions in this embodiment, the drawings used in the embodiments or the description of the prior art will be briefly introduced below. It should be understood that, the drawings in the following description are only examples of the present disclosure. For those skilled in the art, other drawings can be obtained based on these drawings without creative works.

DETAILED DESCRIPTION

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

It is to be understood that, when used in the description and the appended claims of the present disclosure, the terms "including" and "comprising" indicate the presence of stated features, integers, steps, operations, elements and/or components, but do not preclude the presence or addition of one or a plurality of other features, integers, steps, operations, elements, components and/or combinations thereof.

It is also to be understood that the term "and/or" used in the description and the appended claims of the present disclosure refers to any combination of one or more of the associated listed items and all possible combinations, and includes such combinations.

As used in the description and the appended claims, the term "if" may be interpreted as "when" or "once" or "in response to determining" or "in response to detecting" according to the context. Similarly, the phrase "if determined" or "if [the described condition or event] is detected" may be interpreted as "once determining" or "in response to determining" or "on detection of [the described condition or event]" or "in response to detecting [the described condition or event]".

"One embodiment" or "some embodiments" and the like described in the specification of the present disclosure mean that a particular feature, structure, or characteristic which combines the description of the embodiment is included in one or more embodiments of the present disclosure. Thus, the sentences "in one embodiment", "in some embodiments", "in other embodiments", "in the other embodiments" and the like that appear in different places of this specification are not necessarily to refer to the same embodiment, but rather mean "one or more but not all embodiments" unless otherwise specifically emphasized. The terms "including", "comprising", "having" and their variations all mean "including but not limited to" unless otherwise specifically emphasized.

Figure 1:
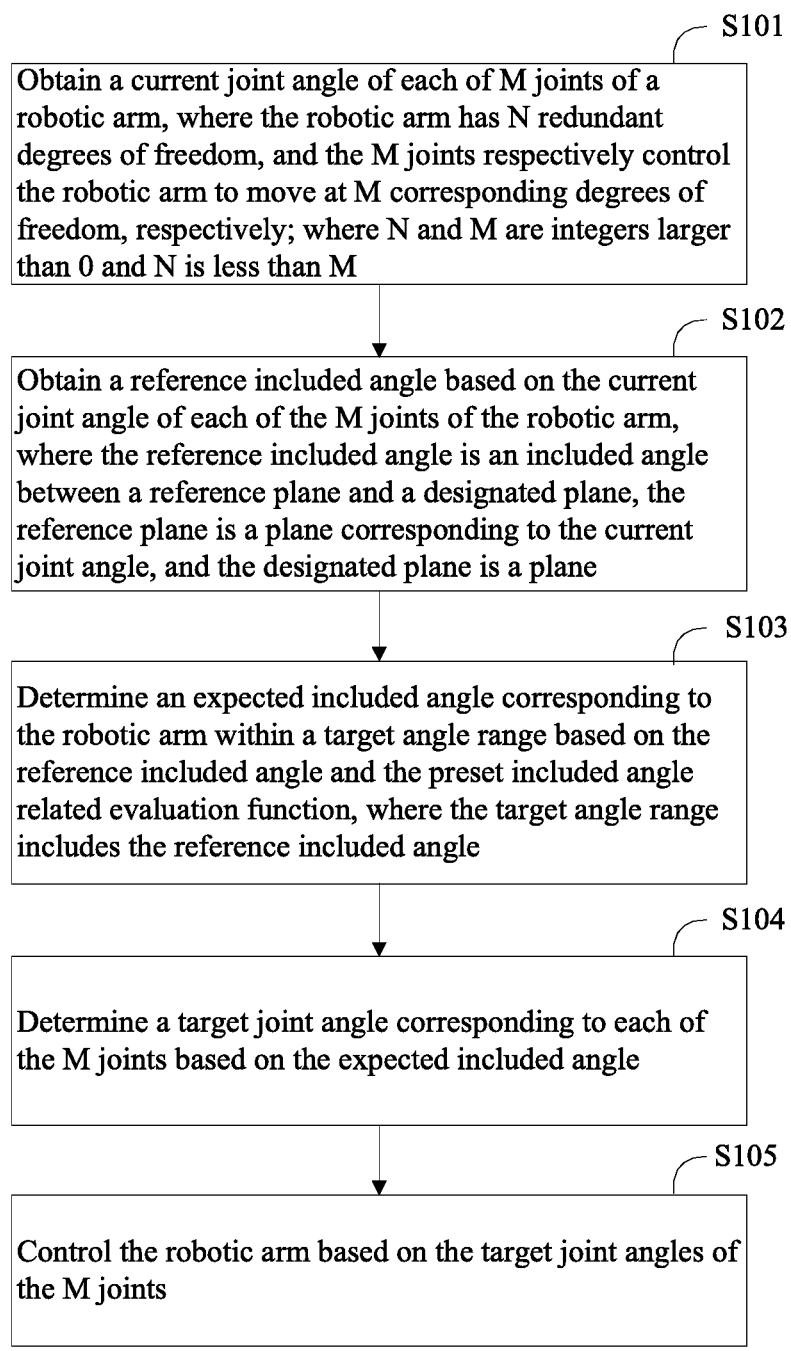
FIG. 1 is a flow chart of an embodiment of a robotic arm control method according to the present disclosure.
Figure 6:
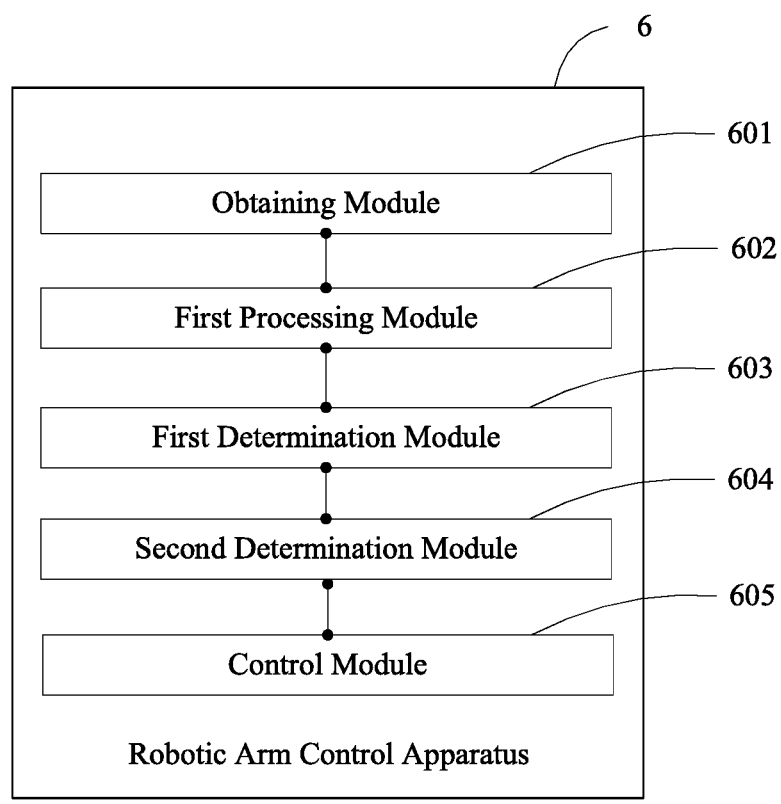
FIG. 6 is a schematic block diagram of the structure of an embodiment of a robotic arm control apparatus according to the present disclosure.
Figure 7:
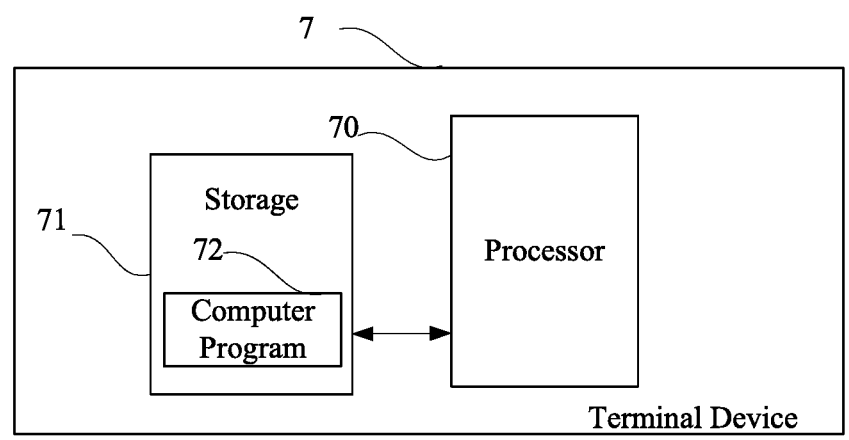
FIG. 7 is a schematic block diagram of the structure of an embodiment of a terminal device according to the present disclosure.

FIG. 1 is a flow chart of an embodiment of a robotic arm control method according to the present disclosure. In this embodiment, a control method for a robotic arm is provided. The method is a computer-implemented method executable for a processor, which may be implemented through and applied to a robotic arm control apparatus as shown in FIG. 6 or a terminal device as shown in FIG. 7, or implemented through a computer readable storage medium.

In this embodiment, the robotic arm control method can be applied to a robotic arm or other terminal device coupled to the robotic arm. For example, the method can be applied to a terminal device such as a robot, a server, a mobile phone, a tablet computer, a wearable device, a vehicle equipment, an augmented reality (AR)/virtual reality (VR) equipment, a laptop, a ultra-mobile personal computer (UMPC), a netbook, or a personal digital assistants (PDA), and realizes the control of the robotic arm through the other terminal device. In this embodiment, the type of the terminal device is not limited.

In the robotic arm control method, the robotic arm has N redundant degrees of freedom and M joints, and the M joints respectively control the robotic arm to move in M corresponding degrees of freedom, respectively. In which, both N and M are integers larger than 0, and N is less than M.

In this embodiment, the robotic arm may have multiple degrees of freedom such as 4 degrees of freedom, 5 degrees of freedom, 6 degrees of freedom, or 7 degrees of freedom. The redundant degrees of freedom are extra degrees of freedom that the robotic arm has in addition to the degrees of freedom required for completing a specified operation. In which, the movement of the robotic arm in the direction of each degree of freedom can be realized through a joint, and the M joints respectively control the robotic arm to move in the corresponding M degrees of freedom, respectively. In which, each joint can correspond to one degree of freedom. The joints can be connected in sequence, or several joints can be combined to each other, where the joint can include one or more of various structures such as a rotational axis, a linear axis, and a connecting rod. There can have multiple manners to configure the joints, and there can also be multiple structures for the joints, which are not limited herein. For example, the robotic arm can have 7 degrees of freedom, and at this time, the robotic arm can include 7 joints; and the degrees of freedom of an end of the robotic arm can be 6, for example, the degrees of freedom of the end can have a degree of freedom that moves linearly along the x axis, a degree of freedom that moves rotationally along the x axis, a degree of freedom that moves linearly along the y axis, a degree of freedom that moves rotationally along the y axis, a degree of freedom that moves linearly along the z axis, and a degree of freedom that moves rotationally along the z axis, and at this time, since the amount of the degrees of freedom of the robotic arm is one more than that of the degrees of freedom required for the end of the robotic arm to move, the robotic arm can have one redundant degree of freedom and seven degrees of freedom.

Figure 2:
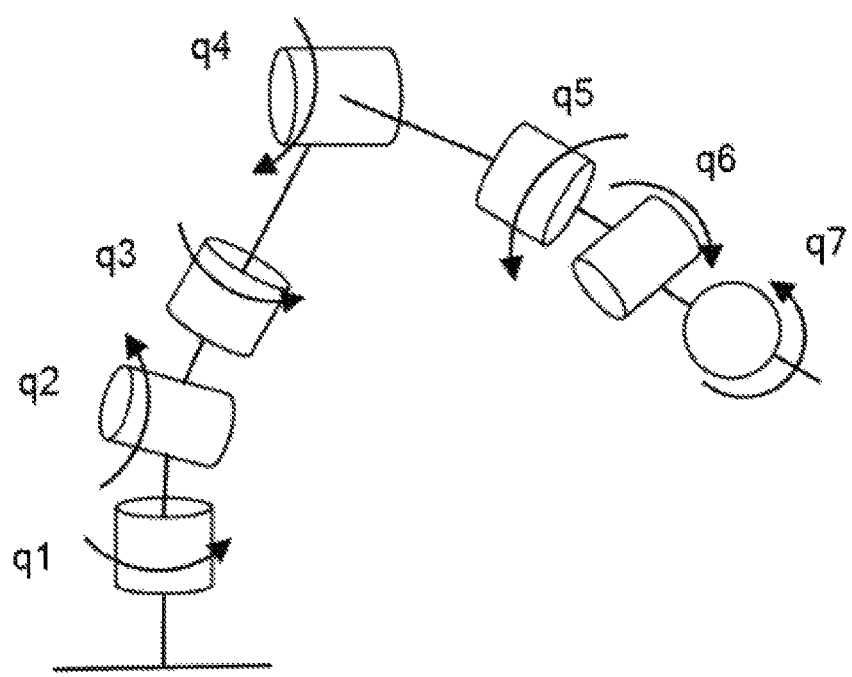
FIG. 2 is a schematic diagram of an example of a robotic arm according to an embodiment of the present disclosure.

FIG. 2 is a schematic diagram of an example of a robotic arm according to an embodiment of the present disclosure. As shown in FIG. 2, in this embodiment, a robotic arm can have one redundant degree of freedom and seven degrees of freedom, and the robotic arm has seven joints of q1, q2, q3, q4, q5, q6, and q7.

In one embodiment, the robotic arm can also have two, three, or other amount of redundant degrees of freedom, where the structure of the robotic arm is not limited herein.

As shown in FIG. 1, the method includes the following steps.

S101: obtaining a current joint angle of each of M joints of the robotic arm, where the robotic arm has N redundant degrees of freedom, and the M joints respectively control the robotic arm to move at M corresponding degrees of freedom, respectively; where N and M are integers larger than 0 and N is less than M.

In this embodiment, there may be multiple methods to obtain the current joint angle, which is not limited herein. Exemplarily, the current joint angle can be obtained in advance through an inverse kinematics solving method based on an expected pose (i.e., an expected position and an expected posture) of an end of the robotic arm at a specific moment; or the current joint angle can be measured in advance through, for example, a joint sensor.

S102: obtaining a reference included angle based on the current joint angle of each of the M joints of the robotic arm, where the reference included angle is an included angle between a reference plane and a designated plane, the reference plane is a plane corresponding to the current joint angle, and the designated plane is a plane corresponding to the M joints in a designated state.

In this embodiment, the reference plane and the designated plane can be associated with the current joint angle. In which, the designated state can be determined through one or more of the current joint angles of the M joints. For example, the designated state may refer to a state of the M joints that the end of the robotic arm is at a target pose and specified joint(s) in the robotic arm is at designated angle(s). At this time, a part of the M joints are at the corresponding current joint angle, while other joints other than the part of the M joints can be in a specific state (e.g., a state of the angle equal to 0). The reference plane may refer to a plane corresponding to the joints in the robotic arm when the joints are all at the current joint angle.

In this embodiment, it should be noted that, the reference included angle may have a positive value and a negative value. At this time, the positive and negative values of the reference included angle may indicate the direction of the reference included angle, for example, a clockwise direction or a counterclockwise direction with respect to a baseline.

The designated plane and the reference plane will be described below with an example as follows.

Figure 3:
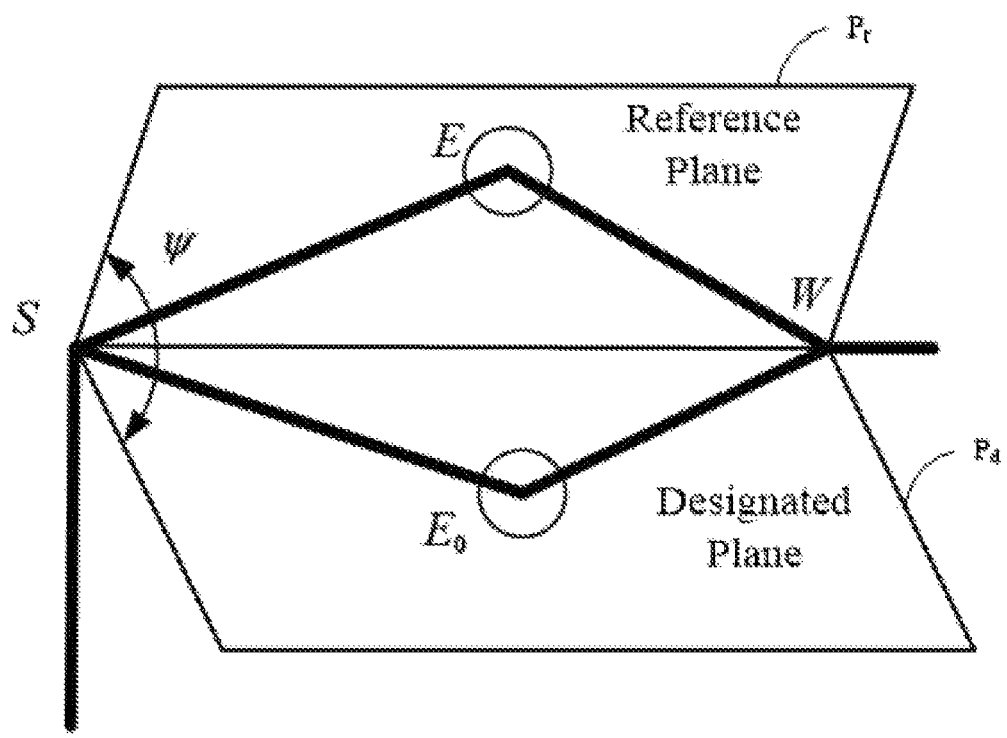
FIG. 3 is a schematic diagram of an example of a designated plane and a reference plane according to an embodiment of the present disclosure.

FIG. 3 is a schematic diagram of an example of a designated plane and a reference plane according to an embodiment of the present disclosure. As shown in FIG. 3, it is an example of a designated plane Pa and a reference plane Pr. In which, the robotic arm has one redundant degree of freedom and seven degrees of freedom. When the 7 joints of the robotic arm are at the corresponding current joint angles, the intersection of the first, the second, and the third joints is the feature point S, and the intersection of the fifth, the sixth, and the seventh joints is the feature point W. In which, when the angle of the third joint in the robotic arm is 0 (i.e., when the M joints can be considered to be in the designated state), the feature point corresponding to the fourth joint is E0; and when the joints in the robotic arm are all at the target angle, the feature point corresponding to the fourth joint is E, and the plane formed by the feature point S, the feature point E, and the feature point W is the reference plane, and the plane formed by the feature point S, the feature point E0, and the feature point W is the designated plane.

An exemplary calculation method of the reference included angle will be described below with an example as follows.

In some embodiments, exemplary, the robotic arm has 1 redundant degree of freedom, and the robotic arm has 7 joints, where the 7 joints are a first joint, a second joint, a third joint, a fourth joint, a fifth joint, a sixth joint, and a seventh joint. The structure of the robotic arm can be similar to a human arm, where the first joint, the second joint, and the third joint can constitute a shoulder joint combination, the fourth joint can be an elbow joint, and the fifth joint, the six joint, and the seventh joint can constitute a wrist joint combination.

At this time, the coordinate of the fourth joint in the base coordinate system of the robotic arm is determined based on the Denavit-Hartenberg (D-H) modeling method, and a first formula for determining the coordinate of the fourth joint in the base coordinate system of the robotic arm is:

$$P_E = {}^0R_1 {}^1R_2(q_1) {}^2R_3(q_2) {}^3R_4(q_3) \vec{r}_{SE};$$

where, $P_E$ is the coordinate of the fourth joint in the base coordinate system of the robotic arm; $^{i-1}R_i(q_i)$ represents the posture of the coordinate system of the i-th joint in the coordinate system of the i−1-th joint; and $\vec{r}_{SE}$ is the vector from the first feature point of the shoulder joint combination to the fourth joint in the coordinate system of the third joint. In which, as an example, the first feature point of the shoulder joint combination can be the intersection of the feature lines of the first joint, the second joint, and the third joint; and $\vec{r}_{SE}=[0,0,l_{se}]$, where $l_{se}$ is the length from the first feature point of the shoulder joint combination to the fourth joint. In which, as an example, the feature line can be an axis of a rotation axis of the corresponding joint.

The coordinate of the second feature point of the wrist joint combination in the base coordinate system of the robotic arm is determined based on the D-H modeling method. In which, a second formula for determining the coordinate of the second feature point of the wrist joint combination in the base coordinate system is:

$$P_W = P_E + {}^0R_1{}^1R_2(q_1)^2R_3(q_2)^3R_4(q_3)^4R_5(q_4)\vec{r}_{EW};$$

where, $P_W$ is the coordinate of the second feature point in the base coordinate system of the robotic arm, $\vec{r}_{EW}$ is the vector from the fourth joint to the second feature point in the coordinate system of the fourth joint, where $\vec{r}_{EW}=[l_{ew},0,0]$ and $l_{ew}$ is the length from the second feature point to the fourth joint. Exemplarily, the second feature point of the wrist joint combination can be the intersection of feature lines of the fifth joint, the sixth joint, and the seventh joint.

Based on the first formula and the second formula, the vector from the fourth joint to the second feature point in the base coordinate system of the robotic arm can be obtained as follows:

$$\vec{r}_{EW}^{\,0} = P_W - P_E.$$

Furthermore, a first designated angle of the first joint and a second designated angle of the second joint in the designated plane can be obtained based on the second formula as follows:

$$\begin{cases} q_1^0 = \arctan 2(x_{P_W}, y_{P_W}) \\ q_2^0 = \arctan 2(z_{P_W}/\sqrt{x_{P_W}^2, y_{P_W}^2}) + \theta \end{cases};$$

where, $q_1^0$ is the first designated angle, $q_2^0$ is the second designated angle, and $P_W=(x_{P_W}, y_{P_W}, z_{P_W})$; if $z_{P_W}<0$, $\theta=0$; and if $z_{P_W}>0$, $\theta=\mathrm{arc\,cos}\;((P_E^TP_E+P_W^TP_W-{}^0\vec{r}_{EW}^{\,T}{}^0\vec{r}_{EW})/\sqrt{P_E^TP_E}\sqrt{P_W^TP_W})$.

At this time, the coordinate of the fourth joint in the base coordinate system of the robotic arm in the designated plane can be obtained based on the third formula as follows:

$$P_{E_0} = {}^0R_1{}^1R_2(q_1^0)^2R_3 q_2^0)^3R_4(0)\vec{r}_{SE}.$$

Based on the first formula, the second formula, and the third formula, a vector ${}^0\vec{r}_{SE}=P_E$ from the first feature point of the shoulder joint combination to the fourth joint in the base coordinate system of the robotic arm and a vector ${}^0\vec{r}_{SW}=P_W$ from the first feature point to the second feature point that are in the reference plane can be obtained, and a vector ${}^0\vec{r}_{SE}^{\,0}=P_{E_0}$ from the first feature point of the shoulder joint combination in the base coordinate system of the robotic arm to the fourth joint in the designated plane can be obtained.

At this time, the vertical vector $\vec{r}$ of the reference plane and the vertical vector $\vec{r}^{\,0}$ of the designated plane are:

$$\begin{cases} \vec{r}^{\,0} = {}^0\vec{r}_{SE}^{\,0} \times {}^0\vec{r}_{Sw} \\ \vec{r}^{\,0} = {}^0\vec{r}_{SE} \times {}^0\vec{r}_{Sw} \end{cases}.$$

Based on $\vec{r}$ and $\vec{r}^{\,0}$, the reference included angle $\psi_0$ can be obtained as follows:

$$\psi_0 = \frac{\vec{r}_0^T \vec{r}}{\sqrt{\vec{r}^T\vec{r}}\sqrt{\vec{r}_0^T\vec{r}_0}}.$$

It should be noted that, in this embodiment, the calculation method of the above-mentioned reference included angle $\psi_0$ is only an example, rather than a limitation.

S103: determining an expected included angle corresponding to the robotic arm within a target angle range based on the reference included angle and the preset included angle related evaluation function, where the target angle range includes the reference included angle.

In this embodiment, the target angle range can be determined according to the actual application scenario. For instance, it can be determined based on one or more of the joint movement range, the control step length, the movement accuracy requirement, or the fluency requirement of each joint of the robotic arm. Exemplarily, the target angle range can be obtained by using the reference included angle as a midpoint. In some embodiments, by limiting the target angle range, the movement of the joint during the continuous movement of the robotic arm can be more stabilized without causing the robotic arm to shake and impact, thereby ensuring smooth movement.

There evaluation function can have multiple forms, for example, one or more of a linear function form, a logarithmic function form, an exponential function form, and the like. Exemplarily, the variables in the evaluation function can include an included angle, and the included angle can include a to-be-evaluated included angle obtained by adjusting the reference included angle, or include one or more of the to-be-evaluated joint angles of the joints which are calculated based on the to-be-evaluated included angle. In some embodiments, through the evaluation function, it can determine whether one or more to-be-evaluated joint angles corresponding to the corresponding to-be-evaluated included angle are within the corresponding joint movement range; furthermore, in some embodiments, it can determine whether each to-be-evaluated joint angle is close to the upper limit or the lower limit of the corresponding joint movement range through the evaluation function, so as to determine, for example, whether the movement of the corresponding joint will close the limit of the joint. The form of the evaluation function can be determined according to the actual application scenario.

S104: determining a target joint angle corresponding to each of the M joints based on the expected included angle.

Through the evaluation function, the expected included angle corresponding to the robotic arm can be determined within the target angle range. Since the expected included angle may correspond to all or a part of the redundant degrees of freedom of the robotic arm, the target joint angles corresponding to the M joints can be determined through inverse kinematics solving or the like by using the expected included angle. At this time, the calculation amount of determining the target joint angles corresponding to the M joints through the expected included angle is significantly smaller than that of determining the target joint angles corresponding to the M joints directly through the expected pose of the end of the robotic arm, hence the calculation efficiency for determining the target joint angle through the method can be higher.

S105: controlling the robotic arm based on the target joint angles of the M joints.

In this embodiment, for example, if the terminal device that executes the method is the robotic arm itself, the related instructions can be issued through a control circuit in the robotic arm to drive the corresponding joints to move according to the corresponding target joint angles. Of course, in some embodiments, the robotic arm can also be controlled through other terminal coupled to the robotic arm. At this time, the other terminal may transmit corresponding control instructions to the robotic arm through a preset information transmission manner to instruct the robotic arm to perform corresponding operations, where the manner of controlling the robotic arm is not limited herein.

Figure 4:
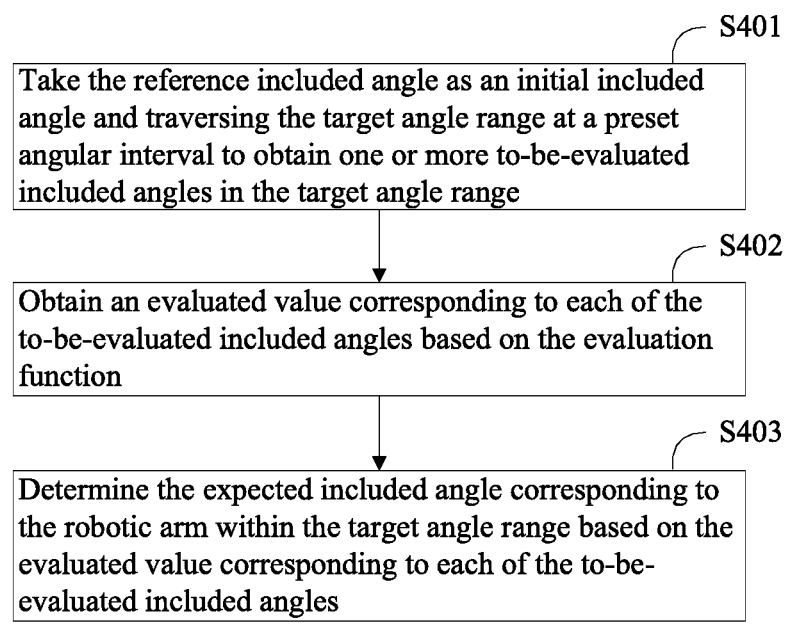
FIG. 4 is a flow chart of step S103 of the robotic arm control method of FIG. 1.

FIG. 4 is a flow chart of step S103 of the robotic arm control method of FIG. 1. As shown in FIG. 4, in this embodiment, step S103 includes the following steps.

S401: taking the reference included angle as an initial included angle and traversing the target angle range at a preset angular interval to obtain one or more to-be-evaluated included angles in the target angle range.

In this embodiment, the preset angular interval can also be considered as a traversal step size. The value of the preset angular interval can be determined according to one or more of, for example, the computing capability of related hardware, software and the like, the size of the target angle range, the computing accuracy requirement, and the computing efficiency requirement.

Exemplarily, in some embodiments, the reference included angle $\psi_0$ of the robotic arm is an initial included angle, the target angle range can be $[-\beta+\psi_0, \beta+\psi_0]$, and the preset angular interval can be $\Delta\psi$.

S402: obtaining an evaluated value corresponding to each of the to-be-evaluated included angles based on the evaluation function.

In which, exemplarily, it can obtain one or more to-be-evaluated joint angles corresponding to the to-be-evaluated included angle, so as to calculate the evaluated value based on the one or more to-be-evaluated joint angles.

It should be noted that, in this embodiment, after obtaining any to-be-evaluated included angle, it can obtain the evaluated value corresponding to the to-be-evaluated included angle based on the evaluation function based on the evaluation function, then obtain the next to-be-evaluated included angle and obtain the evaluated value corresponding to the next to-be-evaluated included angle, and so on, until the target angle range is traversed. In addition, the evaluated values corresponding to each to-be-evaluated included angle can also be obtained in other orders, which is not limited herein.

S403: determining the expected included angle corresponding to the robotic arm within the target angle range based on the evaluated value corresponding to each of the to-be-evaluated included angles.

In this embodiment, the expected included angle corresponding to the robotic arm within the target angle range can be determined according to the magnitude of the evaluated value or the like. The determination can be based on the setting manner of the evaluation function. If the evaluation function indicates that the to-be-evaluated included angle with a larger evaluated value is relatively better, it can determine that among the to-be-evaluated included angles, the to-be-evaluated included angle with the largest corresponding evaluated value can be determined as the expected included angle.

In some embodiments, the step of obtaining the evaluated value corresponding to each to-be-evaluated included angle based on the evaluation function includes:

determining L to-be-evaluated joints corresponding to any of the to-be-evaluated included angles based on the to-be-evaluated included angle, an expected pose of an end of the robotic arm, and a joint movement range corresponding to at least a part of the M joints, where the L to-be-evaluated joints are L joints among the M joints, L is an integer larger than 0, and L is not larger than M;

determining a first joint angles corresponding to each of the L to-be-evaluated joints based on the to-be-evaluated included angle; and obtaining the evaluated value corresponding to the to-be-evaluated included angle through the evaluation function based on each first joint angle and the joint movement ranges corresponding to the L joints.

In this embodiment, the joint movement ranges of each joint of the robotic arm can be different from each other, and due to the difference in application scenarios and structures of the robotic arm, the joints that may move to reach the corresponding limits may also be different. Therefore, for any to-be-evaluated included angle, the L to-be-evaluated joints correspond to the to-be-evaluated included angle is determined based on the to-be-evaluated included angle, the expected pose of the end of the robotic arm, and the joint movement ranges corresponding to all or a part of the M joints. In which, through the evaluation function, it can determine whether each first joint angle corresponding to any to-be-evaluated included angle is within the corresponding joint movement range. In addition, it can also determine whether each joint angle is close to the upper or the lower limit of the corresponding joint movement range through the evaluation function, so as to determine whether the movement of the corresponding joint is close to the limit of the joint or the like.

At this time, the to-be-evaluated joints involved in calculating the evaluated value corresponding to each to-be-evaluated included angle may be different. Correspondingly, the evaluation function can also be adapted to the needs of various application scenarios, so as to obtain more accurate evaluated values and obtain better expected included angles.

In some embodiments, if the first joint angle corresponding to each of the to-be-evaluated joints is within the corresponding joint movement range, the evaluation function is:

$$V_j = \sum_{i=1}^{L} \log(1 + \Delta q_i)$$

$$\Delta q_i = \min(|q_j - q_i^{up}|, |q_i - q_i^{low}|), U_i = [q_i^{low}, q_i^{up}];$$

if there is the first joint angle corresponding to at least one of the to-be-evaluated joints not within the corresponding joint movement range, the evaluation function is:

$$V_j = -\sum_{i=1}^{L} \log(1 + \Delta q_i);$$

where, $V_j$ is the evaluated value of any of the to-be-evaluated included angles $\psi_j$, $q_i$ is the to-be-evaluated joint angle of the i-th joint in the L joints, $U_i$ is a joint movement range corresponding to the i-th joint in the L joints, $q_i^{up}$ is an upper limit of the joint movement range corresponding to the i-th joint, $q_i^{low}$ and a lower limit of the joint movement range corresponding to the i-th joint.

In this embodiment, if there is the first joint angle corresponding to at least one to-be-evaluated joint is not within the corresponding joint movement range, the value of the corresponding evaluation function is negative; and if the first joint angle corresponding to all the to-be-evaluated joints are all within the corresponding joint movement ranges, the value of the corresponding evaluation function is positive. At this time, whether each current joint angle exceeds the corresponding joint movement range can be determined intuitively and conveniently through the positive and negative of the evaluation function. At this time, if the maximum value in the evaluated value is negative, it can be considered that in this operation, the target joint angle corresponding to each of the M joints cannot be reached, that is, the target pose of the robotic arm cannot be reached. At this time, the robotic arm can maintain the current state, that is, each of the M joints can be maintained at the corresponding target joint angle.

However, if the first joint angle corresponding to each of the to-be-evaluated joints is within the corresponding joint movement range, each of the evaluated values can be used to indicate whether each first joint angle corresponding to each to-be-evaluated included angle is close to the upper limit or the lower limit of the corresponding joint movement range or the like. At this time, the expected included angle can be determined according to the magnitude of the evaluated value.

In some embodiments, the robotic arm has one redundant degree of freedom, and the robotic arm has seven joints of a first joint, a second joint, a third joint, a fourth joint, a fifth joint, a sixth joint, and a seventh joint;

where the step of determining the L to-be-evaluated joints corresponding to each to-be-evaluated included angle based on any of the to-be-evaluated included angles, the expected pose of the end of the robotic arm, and a joint movement range corresponding to at least a part of the M joints includes:

calculating a first estimated joint angle corresponding to the fourth joint based on any of the to-be-evaluated included angles and the expected pose of the end of the robotic arm;

determining the to-be-evaluated joint corresponding to the to-be-evaluated included angle as including the sixth joint and the seventh joint, if the first estimated joint angle corresponding to the fourth joint is larger than a first preset angle threshold;

calculating a second estimated joint angle corresponding to the third joint and a third estimated joint angle corresponding to the fifth joint, if the first estimated joint angle corresponding to the fourth joint is smaller than the first preset angle threshold; and determining the to-be-evaluated joint corresponding to the to-be-evaluated included angle as including the third joint and the fifth joint, if a first difference between the second estimated joint angle and one of a upper limit and a lower limit of the joint movement range corresponding to the third joint is less than a first difference threshold and a second difference between the third estimated joint angle and one of a upper limit and a lower limit of the joint movement range corresponding to the fifth joint is less than a second difference threshold.

In this embodiment, there may be differences in the joint movement range of each joint of the robotic arm, which may lead to a certain limit on the movement state of the robotic arm, and lead to some joints in some cases that they will be easier to reach the limit (i.e., the upper limit or the lower limit) of the corresponding joint movement range. At this time, the to-be-evaluated joint can be determined according to the specific application scenario.

In which, in some embodiments, the robotic arm can be a robotic arm with seven degrees of freedom and one redundant degree of freedom, and the movement manner of the robotic arm can be similar to a human arm.

Exemplarily, in some application scenarios, the joint movement ranges corresponding to the seven joints of the robotic arm are as shown in Table 1:

TABLE 1

| | The joint movement range corresponding to the 7 joints of the robotic arm | | | | | | |
|---|---|---|---|---|---|---|---|
| | Joint #1 | Joint #2 | Joint #3 | Joint #4 | Joint #5 | Joint #6 | Joint #7 |
| Joint Movement Range | $-\pi/2$-$\pi$ | $-\pi/2$-$\pi/2$ | $-\pi/2$-$\pi/2$ | 0-$\pi*5/6$ | $-\pi/2$-$\pi/2$ | $-\pi/4$-$\pi/4$ | $-\pi/9$-$\pi/9$ |

In which, in some cases, when the first estimated joint angle corresponding to the fourth joint is larger than the first preset angle threshold, the sixth joint and the seventh joint that have smaller joint movement ranges can be evaluated to avoid the sixth joint and the seventh joint from reaching the limits of the corresponding joint movement range.

However, in some cases, if the first estimated joint angle corresponding to the fourth joint is smaller than the first preset angle threshold, since the fourth joint is usually positioned in the middle of the robotic arm, at this time, the robotic arm can be in a state near straightening. Therefore, it can calculate the second estimated joint angle corresponding to the third joint and the third estimated joint angle corresponding to the fifth joint through inverse kinematics solving or the like, and determine whether the second estimated joint angle and the third estimated joint angle are respectively close to the limit of the corresponding joint movement range based on the second estimated joint angle and the third estimated joint angle. If the second estimated joint angle and the third estimated joint angle are respectively close to the limit of the corresponding joint movement range, the third joint and the fifth joint can be evaluated through the evaluation function. In addition, in some cases, if the second estimated joint angle and the third estimated joint angle are not close to the limits of the corresponding joint movement ranges, it can determine that the to-be-evaluated joint corresponding to the to-be-evaluated included angle includes the sixth joint and the seventh joint while not includes the third joint and the fifth joint.

Through this embodiment, the form of the evaluation function (e.g., the involved variable) can be determined according to the specific application scenario such as the joint angle, so that the evaluation function can more accurately reflect the control state of the robotic arm corresponding to the to-be-evaluated included angle, and can be adapted to various application scenarios.

Figure 5:
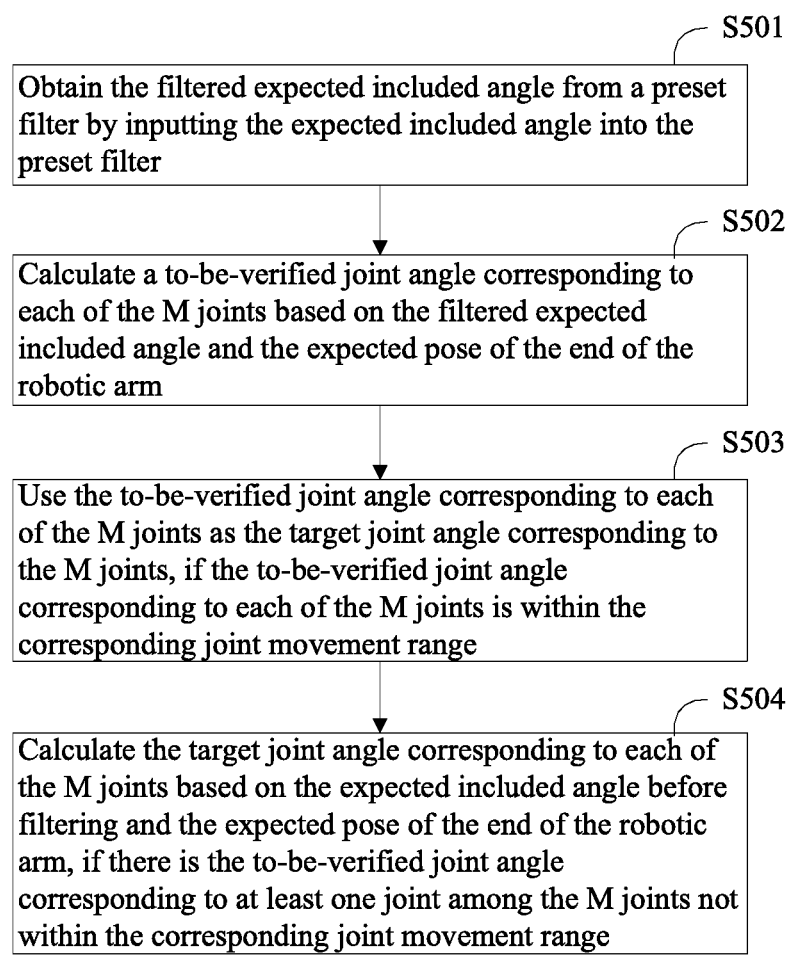
FIG. 5 is a flow chart of step S104 of the robotic arm control method of FIG. 1.

FIG. 5 is a flow chart of step S104 of the robotic arm control method of FIG. 1. As shown in FIG. 5, in this embodiment, step S104 includes the following steps.

S501: obtaining the filtered expected included angle from a preset filter by inputting the expected included angle into the preset filter.

S502: calculating a to-be-verified joint angle corresponding to each of the M joints based on the filtered expected included angle and the expected pose of the end of the robotic arm.

S503: using the to-be-verified joint angle corresponding to each of the M joints as the target joint angle corresponding to the M joints, if the to-be-verified joint angle corresponding to each of the M joints is within the corresponding joint movement range.

S504: calculating the target joint angle corresponding to each of the M joints based on the expected included angle before filtering and the expected pose of the end of the robotic arm, if there is the to-be-verified joint angle corresponding to at least one joint among the M joints not within the corresponding joint movement range.

In this embodiment, the type of the preset filter can be determined according to actual requirements. Exemplarily, the preset filter can be a Kalman filter or the like.

In some embodiments, the preset filter is a Kalman filter, and an observation model of the Kalman filter is:

$$X(K|K-1)=X(K-1|K-1);$$

where, $X(K|K-1)$ indicates a predicted included angle at a current moment, and $X(K-1|K-1)$ indicates the expected included angle at a previous moment.

In which, since the value of the expected included angle is obtained by traversing the target angle range, the value of the expected included angle is not certain. Based on the principle of the Kalman filter, the observation model of the Kalman filter can be a linear model with a slope of zero. At this time, it can consider that the observation model indicate the predicted value at the next time is the estimated value at the previous time, and the parameter H of the test system in the Kalman filter is 1.

The observation model of the Kalman filter can be obtained as:

$$X(K|K-1)=X(K-1|K-1).$$

After obtaining the filtered expected included angle output by the preset filter, the filtered expected included angle is often different from the expected included angle before filtering, hence each joint angle corresponding to the filtered expected included angle may be not within the corresponding joint movement range. Therefore, it can calculate the to-be-verified joint angle corresponding to the M joints based on the filtered expected included angle and the expected pose of the end of the robotic arm, and determine whether the to-be-verified joint angle corresponding to each of the M joints is within the corresponding joint movement range.

In this embodiment, the expected included angle obtained based on the evaluation function may cause a large fluctuation in the movement of the robotic arm, which may cause the robotic arm not to perform corresponding operations smoothly and fluently. In order to reduce the jitter of the robotic arm, the expected included angle can be smoothed through the preset filter to make the movement of the robotic arm more stable.

In this embodiment, it can obtain the current joint angle corresponding to each of the M joints of the robotic arm, and obtain the reference included angle based on the current joint angle corresponding to each of the M joints of the robotic arm. At this time, the reference included angle can reflect the redundant degrees of freedom of the robotic arm.

In some cases, the angles of the joints of the robotic arm can be adjusted by adjusting the reference included angle so that the corresponding calculation efficiency can be higher; furthermore, the expected included angle corresponding to the robotic arm within the target angle range is determined based on the reference included angle and the preset evaluation function with respect to the included angle, the target joint angle corresponding to each of the M joints is determined based on the expected included angle, and the target angle range is determined based on the reference included angle, so as to determine the expected included angle and the corresponding target joint angle through the evaluation function in the target angle range, so that in some cases, it can ensure that the eventually obtained target joint angle meets the corresponding limitation of the joint movement range through the evaluation function, and ensure the smooth movement of the robotic arm by limiting the target angle range. Through this embodiment, it can perform a relatively stable and smooth control operation on the robotic arm with higher calculation efficiency under the corresponding limitation condition of the joint movement range.

It should be understood that, the sequence of the serial number of the steps in the above-mentioned embodiments does not mean the execution order while the execution order of each process should be determined by its function and internal logic, which should not be taken as any limitation to the implementation process of the embodiments.

FIG. 6 is a schematic block diagram of the structure of an embodiment of a robotic arm control apparatus according to the present disclosure. In this embodiment, a robotic arm control apparatus 6 for a robotic arm is provided, which corresponds to the robotic arm control method described in the above-mentioned embodiment. For convenience of explanation, only those related to this embodiment are shown.

As shown in FIG. 6, the robotic arm control apparatus 6 includes:

an obtaining module 601 configured to obtain a current joint angle of each of M joints of the robotic arm, where the robotic arm has N redundant degrees of freedom, and the M joints respectively control the robotic arm to move at M corresponding degrees of freedom, respectively; where N and M are integers larger than 0 and N is less than M;

a first processing module 602 configured to obtain a reference included angle based on the current joint angle of each of the M joints of the robotic arm, where the reference included angle is an included angle between a reference plane and a designated plane, the reference plane is a plane corresponding to the current joint angle, and the designated plane is a plane corresponding to the M joints in a designated state;

a first determination module 603 configured to determine an expected included angle corresponding to the robotic arm within a target angle range based on the reference included angle and the preset included angle related evaluation function, where the target angle range includes the reference included angle;

a second determination module 604 configured to determine a target joint angle corresponding to each of the M joints based on the expected included angle; and a control module 605 configured to control the robotic arm based on the target joint angles of the M joints.

In one embodiment, the first determination module 603 includes:

a first processing unit configured to take the reference included angle as an initial included angle and traverse the target angle range at a preset angular interval to obtain one or more to-be-evaluated included angles in the target angle range;

a second processing unit configured to obtain an evaluated value corresponding to each of the to-be-evaluated included angles based on the evaluation function; and a first determination unit configured to determine the expected included angle corresponding to the robotic arm within the target angle range based on the evaluated value corresponding to each of the to-be-evaluated included angles.

In one embodiment, the second processing unit includes:

a first determination subunit configured to determine L to-be-evaluated joints corresponding to any of the to-be-evaluated included angles based on the to-be-evaluated included angle, an expected pose of an end of the robotic arm, and a joint movement range corresponding to at least a part of the M joints, where the L to-be-evaluated joints are L joints among the M joints, L is an integer larger than 0, and L is not larger than M;

a second determination subunit configured to determine a first joint angles corresponding to each of the L to-be-evaluated joints based on the to-be-evaluated included angle; and a first processing subunit is configured to obtain the evaluated value corresponding to the to-be-evaluated included angle through the evaluation function based on each first joint angle and the joint movement ranges corresponding to the L joints.

In one embodiment, if the first joint angle corresponding to each of the to-be-evaluated joints is within the corresponding joint movement range, the evaluation function is:

$$V_j = \sum_{i=1}^{L} \log(1 + \Delta q_i)$$

$$\Delta q_i = \min(|q_j - q_i^{up}|, |q_i - q_i^{low}|), U_i = [q_i^{low}, q_i^{up}];$$

if there is the first joint angle corresponding to at least one of the to-be-evaluated joints not within the corresponding joint movement range, the evaluation function is:

$$V_j = -\sum_{i=1}^{L} \log(1 + \Delta q_i);$$

where, $V_j$ is the evaluated value of any of the to-be-evaluated included angles $\psi_j$, $q_i$ is the to-be-evaluated joint angle of the i-th joint in the L joints, $U_i$ is a joint movement range corresponding to the i-th joint in the L joints, $q_i^{up}$ is an upper limit of the joint movement range corresponding to the i-th joint, and $q_i^{low}$ is a lower limit of the joint movement range corresponding to the i-th joint.

In one embodiment, the robotic arm has one redundant degree of freedom, and the robotic arm has seven joints of a first joint, a second joint, a third joint, a fourth joint, a fifth joint, a sixth joint, and a seventh joint;

the first processing unit includes:

a first calculation subunit configured to calculate a first estimated joint angle corresponding to the fourth joint based on any of the to-be-evaluated included angles and the expected pose of the end of the robotic arm;

a third determining subunit configured to determine the to-be-evaluated joint corresponding to the to-be-evaluated included angle as including the sixth joint and the seventh joint, if the first estimated joint angle corresponding to the fourth joint is larger than a first preset angle threshold;

a second calculation subunit configured to calculate a second estimated joint angle corresponding to the third joint and a third estimated joint angle corresponding to the fifth joint, if the first estimated joint angle corresponding to the fourth joint is smaller than the first preset angle threshold; and a fourth determining subunit is configured to determine the to-be-evaluated joint corresponding to the to-be-evaluated included angle as including the third joint and the fifth joint, if a first difference between the second estimated joint angle and one of a upper limit and a lower limit of the joint movement range corresponding to the third joint is less than a first difference threshold and a second difference between the third estimated joint angle and one of a upper limit and a lower limit of the joint movement range corresponding to the fifth joint being less than a second difference threshold.

In one embodiment, the second determination module 604 includes:

a third processing unit configured to obtain the filtered expected included angle from a preset filter by inputting the expected included angle into the preset filter;

a first calculation unit configured to calculate a to-be-verified joint angle corresponding to each of the M joints based on the filtered expected included angle and the expected pose of the end of the robotic arm;

a fourth processing unit configured to use the to-be-verified joint angle corresponding to each of the M joints as the target joint angle corresponding to the M joints, if the to-be-verified joint angle corresponding to each of the M joints is within the corresponding joint movement range; and a second calculation unit configured to calculate the target joint angle corresponding to each of the M joints based on the expected included angle before filtering and the expected pose of the end of the robotic arm, if there is the to-be-verified joint angle corresponding to at least one joint among the M joints not within the corresponding joint movement range.

In one embodiment, the preset filter is a Kalman filter, and an observation model of the Kalman filter is:

$$X(K|K-1)=X(K-1|K-1);$$

where, $X(K|K-1)$ indicates a predicted included angle at a current moment, and $X(K-1|K-1)$ indicates the expected included angle at a previous moment.

In this embodiment, each of the above-mentioned modules/units is implemented in the form of software, which can be computer program(s) stored in a memory of the robotic arm control apparatus and executable on a processor of the robotic arm control apparatus. In other embodiments, each of the above-mentioned modules/units may be implemented in the form of hardware (e.g., a circuit of the robotic arm control apparatus which is coupled to the processor of the robotic arm control apparatus) or a combination of hardware and software (e.g., a circuit with a single chip microcomputer).

In this embodiment, it can obtain the current joint angle corresponding to each of the M joints of the robotic arm, and obtain the reference included angle based on the current joint angle corresponding to each of the M joints of the robotic arm. At this time, the reference included angle can reflect the redundant degrees of freedom of the robotic arm. In some cases, the angles of the joints of the robotic arm can be adjusted by adjusting the reference included angle so that the corresponding calculation efficiency can be higher; furthermore, the expected included angle corresponding to the robotic arm within the target angle range is determined based on the reference included angle and the preset evaluation function with respect to the included angle, the target joint angle corresponding to each of the M joints is determined based on the expected included angle, and the target angle range is determined based on the reference included angle, so as to determine the expected included angle and the corresponding target joint angle through the evaluation function in the target angle range, so that in some cases, it can ensure that the eventually obtained target joint angle meets the corresponding limitation of the joint movement range through the evaluation function, and ensure the smooth movement of the robotic arm by limiting the target angle range. Through this embodiment, it can perform a relatively stable and smooth control operation on the robotic arm with higher calculation efficiency under the corresponding limitation condition of the joint movement range.

It should be noted that, since the information interaction, execution process, and other content between the above apparatus/units are based on the same concept as the method embodiments of the present disclosure, their functions and technical effects can refer to the method embodiments, which are not repeated herein.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

FIG. 7 is a schematic block diagram of the structure of an embodiment of a terminal device according to the present disclosure. In this embodiment, as shown in FIG. 7, the terminal device 7 includes at least one processor 70 (only one is shown in FIG. 7), a storage 71, and a computer program 72 stored in the storage 71 and executable on the processor 70. When the processor 70 executes the computer program 72, the steps in any of the foregoing embodiments of the robotic arm control method are implemented.

The terminal device 7 may be a computing device such as a robot, a robotic arm, a desktop computer, a notebook, a palmtop computer, and a cloud server. The terminal device 7 is a computing device such as a desktop computer, a notebook, a palmtop computer, and a cloud server. When the device is installed, the terminal device 7 may be coupled to the robotic arm to control the robotic arm. The terminal device may include, but is not limited to, a processor 70 and a storage 71. Those skilled in the art can understand that FIG. 7 is only an example of the terminal device 7 and does not constitute a limitation on the terminal device 7. It may include more or fewer components than shown in the figure, or combine some components or different components. For example, it can also include input devices, output devices, network access devices, and so on. The input device may include a touchpad, a fingerprint collection sensor (for collecting fingerprint information and orientation information of a user), a microphone, a camera, and the like, and an output device may include a display, a speaker, and the like.

The processor 70 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

In some embodiments, the storage 71 may be an internal storage unit of the terminal device 7, for example, a hard disk or a memory of the terminal device 7. In other embodiments, the storage 71 may also be an external storage device of the terminal device 7, for example, a plug-in hard disk, a smart media card (SMC), a secure digital (SD) card, flash card, and the like, which is equipped on the terminal device 7. Furthermore, the storage 71 may further include both an internal storage unit and an external storage device, of the terminal device 7. The storage 71 is configured to store operating systems, application programs, boot loaders, data, and other programs such as program codes of the above-mentioned computer program. The storage 71 may also be used to temporarily store data that has been output or is to be output.

In addition, although not shown, the above-mentioned terminal device 7 may further include a network connecting module such as a Bluetooth module, a Wi-Fi module, a cellular network module, which is not described herein.

In this embodiment, when the processor 70 executes the computer program 72 to implement the steps in any of the embodiments of the robotic arm control method, it can obtain the current joint angle corresponding to each of the M joints of the robotic arm, and obtain the reference included angle based on the current joint angle corresponding to each of the M joints of the robotic arm. At this time, the reference included angle can reflect the redundant degrees of freedom of the robotic arm. In some cases, the angles of the joints of the robotic arm can be adjusted by adjusting the reference included angle so that the corresponding calculation efficiency can be higher; furthermore, the expected included angle corresponding to the robotic arm within the target angle range is determined based on the reference included angle and the preset evaluation function with respect to the included angle, the target joint angle corresponding to each of the M joints is determined based on the expected included angle, and the target angle range is determined based on the reference included angle, so as to determine the expected included angle and the corresponding target joint angle through the evaluation function in the target angle range, so that in some cases, it can ensure that the eventually obtained target joint angle meets the corresponding limitation of the joint movement range through the evaluation function, and ensure the smooth movement of the robotic arm by limiting the target angle range. Through this embodiment, it can perform a relatively stable and smooth control operation on the robotic arm with higher calculation efficiency under the corresponding limitation condition of the joint movement range.

An embodiment of the present disclosure further provides a computer-readable storage medium. The computer-readable storage medium stores a computer program, and when the computer program is executed by a processor, steps in each of the foregoing method embodiments can be implemented.

An embodiment of the present disclosure further provides a computer program product. When the computer program product executes on a terminal device, the terminal device can implement the steps in each of the foregoing method embodiments.

When the integrated unit is implemented in the form of a software functional unit and is sold or used as an independent product, the integrated unit may be stored in a non-transitory computer-readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes to an apparatus/terminal device, a recording medium, a USB flash drive, a portable hard disk, a magnetic disk, an optical disk, a computer memory, a read-only memory (ROM), a random access memory (RAM), electric carrier signals, telecommunication signals and software distribution media. In some jurisdictions, according to the legislation and patent practice, a computer readable medium does not include electric carrier signals and telecommunication signals.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (or device)/terminal device and method may be implemented in other manners. For example, the above-mentioned apparatus/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of this embodiment, and should be included within the scope of the present disclosure.

What is claimed is:

1. A computer-implemented control method for a robotic arm, comprising executing on a processor steps of:
    obtaining a current joint angle of each of M joints of the robotic arm, wherein the robotic arm has N redundant degrees of freedom, and the M joints respectively control the robotic arm to move at M corresponding degrees of freedom, respectively; wherein N and M are integers larger than 0 and N is less than M;
    obtaining a reference included angle based on the current joint angle of each of the M joints of the robotic arm, wherein the reference included angle is an included angle between a reference plane and a designated plane, the reference plane is a plane corresponding to the current joint angle, and the designated plane is a plane corresponding to the M joints in a designated state;
    determining an expected included angle corresponding to the robotic arm within a target angle range based on the reference included angle and the preset included angle related evaluation function, wherein the target angle range comprises the reference included angle;
    determining a target joint angle corresponding to each of the M joints based on the expected included angle; and
    controlling the robotic arm based on the target joint angles of the M joints.

2. The method of claim 1, wherein the step of determining the expected included angle corresponding to the robotic arm within the target angle range based on the reference included angle and a preset included angle related evaluation function comprises:
    taking the reference included angle as an initial included angle and traversing the target angle range at a preset angular interval to obtain one or more to-be-evaluated included angles in the target angle range;
    obtaining an evaluated value corresponding to each of the to-be-evaluated included angles based on the evaluation function; and
    determining the expected included angle corresponding to the robotic arm within the target angle range based on the evaluated value corresponding to each of the to-be-evaluated included angles.

3. The method of claim 2, wherein the step of obtaining the evaluated value corresponding to each to-be-evaluated included angle based on the evaluation function comprises:
    determining L to-be-evaluated joints corresponding to any of the to-be-evaluated included angles based on the to-be-evaluated included angle, an expected pose of an end of the robotic arm, and a joint movement range corresponding to at least a part of the M joints, wherein the L to-be-evaluated joints are L joints among the M joints, L is an integer larger than 0, and L is not larger than M;

determining a first joint angles corresponding to each of the L to-be-evaluated joints based on the to-be-evaluated included angle; and obtaining the evaluated value corresponding to the to-be-evaluated included angle through the evaluation function based on each first joint angle and the joint movement ranges corresponding to the L joints.

4. The method of claim 3, wherein if the first joint angle corresponding to each of the to-be-evaluated joints is within the corresponding joint movement range, the evaluation function is:

$$V_j = \sum_{i=1}^{L} \log(1 + \Delta q_i)$$

$$\Delta q_i = \min(|q_j - q_i^{up}|, |q_i - q_i^{low}|), U_i = [q_i^{low}, q_i^{up}];$$

if there is the first joint angle corresponding to at least one of the to-be-evaluated joints not within the corresponding joint movement range, the evaluation function is:

$$V_j = -\sum_{i=1}^{L} \log(1 + \Delta q_i);$$

where, $V_j$ is the evaluated value of any of the to-be-evaluated included angles $\psi_j$, $q_i$ is the to-be-evaluated joint angle of the i-th joint in the L joints, $U_i$ is a joint movement range corresponding to the i-th joint in the L joints, $q_i^{up}$ is an upper limit of the joint movement range corresponding to the i-th joint, and $q_i^{low}$ is a lower limit of the joint movement range corresponding to the i-th joint.

5. The method of claim 3, wherein the robotic arm has one redundant degree of freedom, and the robotic arm has seven joints of a first joint, a second joint, a third joint, a fourth joint, a fifth joint, a sixth joint, and a seventh joint;

wherein the step of determining the L to-be-evaluated joints corresponding to each to-be-evaluated included angle based on any of the to-be-evaluated included angles, the expected pose of the end of the robotic arm, and a joint movement range corresponding to at least a part of the M joints comprises:

calculating a first estimated joint angle corresponding to the fourth joint based on any of the to-be-evaluated included angles and the expected pose of the end of the robotic arm;

determining the to-be-evaluated joint corresponding to the to-be-evaluated included angle as comprising the sixth joint and the seventh joint, in response to the first estimated joint angle corresponding to the fourth joint being larger than a first preset angle threshold;

calculating a second estimated joint angle corresponding to the third joint and a third estimated joint angle corresponding to the fifth joint, in response to the first estimated joint angle corresponding to the fourth joint being smaller than the first preset angle threshold; and determining the to-be-evaluated joint corresponding to the to-be-evaluated included angle as comprising the third joint and the fifth joint, in response to a first difference between the second estimated joint angle and one of a upper limit and a lower limit of the joint movement range corresponding to the third joint being less than a first difference threshold and a second difference between the third estimated joint angle and one of a upper limit and a lower limit of the joint movement range corresponding to the fifth joint being less than a second difference threshold.

6. The method of claim 1, wherein the step of determining the target joint angle corresponding to each of the M joints based on the expected included angle comprises:

obtaining the filtered expected included angle from a preset filter by inputting the expected included angle into the preset filter;

calculating a to-be-verified joint angle corresponding to each of the M joints based on the filtered expected included angle and the expected pose of the end of the robotic arm;

using the to-be-verified joint angle corresponding to each of the M joints as the target joint angle corresponding to the M joints, in response to the to-be-verified joint angle corresponding to each of the M joints being within the corresponding joint movement range; and calculating the target joint angle corresponding to each of the M joints based on the expected included angle before filtering and the expected pose of the end of the robotic arm, in response to there being the to-be-verified joint angle corresponding to at least one joint among the M joints not within the corresponding joint movement range.

7. The method of claim 6, wherein the preset filter is a Kalman filter, and an observation model of the Kalman filter is:

$$X(K|K-1)=X(K-1|K-1);$$

where, $X(K|K-1)$ indicates a predicted included angle at a current moment, and $X(K-1|K-1)$ indicates the expected included angle at a previous moment.

8. A control apparatus for a robotic arm, comprising:

an obtaining module configured to obtain a current joint angle of each of M joints of the robotic arm, wherein the robotic arm has N redundant degrees of freedom, and the M joints respectively control the robotic arm to move at M corresponding degrees of freedom, respectively; wherein N and M are integers larger than 0 and N is less than M;

a first processing module configured to obtain a reference included angle based on the current joint angle of each of the M joints of the robotic arm, wherein the reference included angle is an included angle between a reference plane and a designated plane, the reference plane is a plane corresponding to the current joint angle, and the designated plane is a plane corresponding to the M joints in a designated state;

a first determination module configured to determine an expected included angle corresponding to the robotic arm within a target angle range based on the reference included angle and the preset included angle related evaluation function, wherein the target angle range comprises the reference included angle;

a second determination module configured to determine a target joint angle corresponding to each of the M joints based on the expected included angle; and a control module configured to control the robotic arm based on the target joint angles of the M joints.

9. The apparatus of claim 8, wherein the first determination module comprises:

a first processing unit configured to take the reference included angle as an initial included angle and traverse the target angle range at a preset angular interval to obtain one or more to-be-evaluated included angles in the target angle range;

a second processing unit configured to obtain an evaluated value corresponding to each of the to-be-evaluated included angles based on the evaluation function; and a first determination unit configured to determine the expected included angle corresponding to the robotic arm within the target angle range based on the evaluated value corresponding to each of the to-be-evaluated included angles.

10. The apparatus of claim 9, wherein the second processing unit comprises:

a first determination subunit configured to determine L to-be-evaluated joints corresponding to any of the to-be-evaluated included angles based on the to-be-evaluated included angle, an expected pose of an end of the robotic arm, and a joint movement range corresponding to at least a part of the M joints, wherein the L to-be-evaluated joints are L joints among the M joints, L is an integer larger than 0, and L is not larger than M;

a second determination subunit configured to determine a first joint angles corresponding to each of the L to-be-evaluated joints based on the to-be-evaluated included angle; and a first processing subunit is configured to obtain the evaluated value corresponding to the to-be-evaluated included angle through the evaluation function based on each first joint angle and the joint movement ranges corresponding to the L joints.

11. The apparatus of claim 10, wherein if the first joint angle corresponding to each of the to-be-evaluated joints is within the corresponding joint movement range, the evaluation function is:

$$V_j = \sum_{i=1}^{L} \log(1 + \Delta q_i)$$

$$\Delta q_i = \min(|q_j - q_i^{up}|, |q_i - q_i^{low}|), U_i = [q_i^{low}, q_i^{up}];$$

if there is the first joint angle corresponding to at least one of the to-be-evaluated joints not within the corresponding joint movement range, the evaluation function is:

$$V_j = -\sum_{i=1}^{L} \log(1 + \Delta q_i);$$

where, $V_j$ is the evaluated value of any of the to-be-evaluated included angles $\psi_j$, $q_i$ is the to-be-evaluated joint angle of the i-th joint in the L joints, $U_i$ is a joint movement range corresponding to the i-th joint in the L joints, $q_i^{up}$ is an upper limit of the joint movement range corresponding to the i-th joint, and $q_i^{low}$ is a lower limit of the joint movement range corresponding to the i-th joint.

12. The apparatus of claim 10, wherein the robotic arm has one redundant degree of freedom, and the robotic arm has seven joints of a first joint, a second joint, a third joint, a fourth joint, a fifth joint, a sixth joint, and a seventh joint; wherein the first processing unit comprises:

a first calculation subunit configured to calculate a first estimated joint angle corresponding to the fourth joint based on any of the to-be-evaluated included angles and the expected pose of the end of the robotic arm;

a third determining subunit configured to determine the to-be-evaluated joint corresponding to the to-be-evaluated included angle as comprising the sixth joint and the seventh joint, in response to the first estimated joint angle corresponding to the fourth joint being larger than a first preset angle threshold;

a second calculation subunit configured to calculate a second estimated joint angle corresponding to the third joint and a third estimated joint angle corresponding to the fifth joint, in response to the first estimated joint angle corresponding to the fourth joint being smaller than the first preset angle threshold; and a fourth determining subunit is configured to determine the to-be-evaluated joint corresponding to the to-be-evaluated included angle as comprising the third joint and the fifth joint, in response to a first difference between the second estimated joint angle and one of a upper limit and a lower limit of the joint movement range corresponding to the third joint being less than a first difference threshold and a second difference between the third estimated joint angle and one of a upper limit and a lower limit of the joint movement range corresponding to the fifth joint being less than a second difference threshold.

13. The apparatus of claim 8, wherein the second determination module comprises:

a third processing unit configured to obtain the filtered expected included angle from a preset filter by inputting the expected included angle into the preset filter;

a first calculation unit configured to calculate a to-be-verified joint angle corresponding to each of the M joints based on the filtered expected included angle and the expected pose of the end of the robotic arm;

a fourth processing unit configured to use the to-be-verified joint angle corresponding to each of the M joints as the target joint angle corresponding to the M joints, in response to the to-be-verified joint angle corresponding to each of the M joints being within the corresponding joint movement range; and a second calculation unit configured to calculate the target joint angle corresponding to each of the M joints based on the expected included angle before filtering and the expected pose of the end of the robotic arm, in response to there being the to-be-verified joint angle corresponding to at least one joint among the M joints not within the corresponding joint movement range.

14. A terminal device for a robotic arm, comprising:

a memory;

a processor; and one or more computer programs stored in the memory and executable on the processor, wherein the one or more computer programs comprise:

instructions for obtaining a current joint angle of each of M joints of the robotic arm, wherein the robotic arm has N redundant degrees of freedom, and the M joints respectively control the robotic arm to move at M corresponding degrees of freedom, respectively; wherein N and M are integers larger than 0 and N is less than M;

instructions for obtaining a reference included angle based on the current joint angle of each of the M joints of the robotic arm, wherein the reference included angle is an included angle between a reference plane and a designated plane, the reference plane is a plane corresponding to the current joint angle, and the designated plane is a plane corresponding to the M joints in a designated state;

instructions for determining an expected included angle corresponding to the robotic arm within a target angle range based on the reference included angle and the preset included angle related evaluation function, wherein the target angle range comprises the reference included angle;

instructions for determining a target joint angle corresponding to each of the M joints based on the expected included angle; and instructions for controlling the robotic arm based on the target joint angles of the M joints.

15. The terminal device of claim 14, wherein the instructions for determining the expected included angle corresponding to the robotic arm within the target angle range based on the reference included angle and a preset included angle related evaluation function comprise:

instructions for taking the reference included angle as an initial included angle and traversing the target angle range at a preset angular interval to obtain one or more to-be-evaluated included angles in the target angle range;

instructions for obtaining an evaluated value corresponding to each of the to-be-evaluated included angles based on the evaluation function; and instructions for determining the expected included angle corresponding to the robotic arm within the target angle range based on the evaluated value corresponding to each of the to-be-evaluated included angles.

16. The terminal device of claim 15, wherein the instructions for obtaining the evaluated value corresponding to each to-be-evaluated included angle based on the evaluation function comprise:

instructions for determining L to-be-evaluated joints corresponding to any of the to-be-evaluated included angles based on the to-be-evaluated included angle, an expected pose of an end of the robotic arm, and a joint movement range corresponding to at least a part of the M joints, wherein the L to-be-evaluated joints are L joints among the M joints, L is an integer larger than 0, and L is not larger than M;

instructions for determining a first joint angles corresponding to each of the L to-be-evaluated joints based on the to-be-evaluated included angle; and instructions for obtaining the evaluated value corresponding to the to-be-evaluated included angle through the evaluation function based on each first joint angle and the joint movement ranges corresponding to the L joints.

17. The terminal device of claim 16, wherein if the first joint angle corresponding to each of the to-be-evaluated joints is within the corresponding joint movement range, the evaluation function is:

$$V_j = \sum_{i=1}^{L} \log(1 + \Delta q_i)$$

$$\Delta q_i = \min(|q_j - q_i^{up}|, |q_i - q_i^{low}|), U_i = [q_i^{low}, q_i^{up}];$$

if there is the first joint angle corresponding to at least one of the to-be-evaluated joints not within the corresponding joint movement range, the evaluation function is:

$$V_j = -\sum_{i=1}^{L} \log(1 + \Delta q_i);$$

where, $V_j$ is the evaluated value of any of the to-be-evaluated included angles $\psi_j$, $q_i$ is the to-be-evaluated joint angle of the i-th joint in the L joints, $U_i$ is a joint movement range corresponding to the i-th joint in the L joints, $q_i^{up}$ is an upper limit of the joint movement range corresponding to the i-th joint, and $q_i^{low}$ is a lower limit of the joint movement range corresponding to the i-th joint.

18. The terminal device of claim 16, wherein the robotic arm has one redundant degree of freedom, and the robotic arm has seven joints of a first joint, a second joint, a third joint, a fourth joint, a fifth joint, a sixth joint, and a seventh joint;

wherein the instructions for determining the L to-be-evaluated joints corresponding to each to-be-evaluated included angle based on any of the to-be-evaluated included angles, the expected pose of the end of the robotic arm, and a joint movement range corresponding to at least a part of the M joints comprise:

instructions for calculating a first estimated joint angle corresponding to the fourth joint based on any of the to-be-evaluated included angles and the expected pose of the end of the robotic arm;

instructions for determining the to-be-evaluated joint corresponding to the to-be-evaluated included angle as comprising the sixth joint and the seventh joint, in response to the first estimated joint angle corresponding to the fourth joint being larger than a first preset angle threshold;

instructions for calculating a second estimated joint angle corresponding to the third joint and a third estimated joint angle corresponding to the fifth joint, in response to the first estimated joint angle corresponding to the fourth joint being smaller than the first preset angle threshold; and instructions for determining the to-be-evaluated joint corresponding to the to-be-evaluated included angle as comprising the third joint and the fifth joint, in response to a first difference between the second estimated joint angle and one of a upper limit and a lower limit of the joint movement range corresponding to the third joint being less than a first difference threshold and a second difference between the third estimated joint angle and one of a upper limit and a lower limit of the joint movement range corresponding to the fifth joint being less than a second difference threshold.

19. The terminal device of claim 14, wherein the instructions for determining the target joint angle corresponding to each of the M joints based on the expected included angle comprise:

instructions for obtaining the filtered expected included angle from a preset filter by inputting the expected included angle into the preset filter;

instructions for calculating a to-be-verified joint angle corresponding to each of the M joints based on the filtered expected included angle and the expected pose of the end of the robotic arm;

instructions for using the to-be-verified joint angle corresponding to each of the M joints as the target joint angle corresponding to the M joints, in response to the to-be-verified joint angle corresponding to each of the M joints being within the corresponding joint movement range; and instructions for calculating the target joint angle corresponding to each of the M joints based on the expected included angle before filtering and the expected pose of the end of the robotic arm, in response to there being the to-be-verified joint angle corresponding to at least one joint among the M joints not within the corresponding joint movement range.

20. The terminal device of claim 19, wherein the preset filter is a Kalman filter, and an observation model of the Kalman filter is:

$$X(K|K-1)=X(K-1|K-1);$$

where, $X(K|K-1)$ indicates a predicted included angle at a current moment, and $X(K-1|K-1)$ indicates the expected included angle at a previous moment.

\* \* \* \* \*